Oct. 7, 1924. Re. 15,928

J. E. JUDY

DRILLING MACHINE FOR TAPPING OUT THE HOT METAL OF FURNACES AND CUPOLAS

Original Filed April 8, 1921

INVENTOR

Joseph C. Judy

By Byrne, Stebbins & Barnes.

his attys.

Reissued Oct. 7, 1924. Re. 15,928

UNITED STATES PATENT OFFICE.

JOSEPH E. JUDY, OF McKEESPORT, PENNSYLVANIA.

DRILLING MACHINE FOR TAPPING OUT THE HOT METAL OF FURNACES AND CUPOLAS.

Original No. 1,424,483, dated August 1, 1922, Serial No. 459,628, filed April 8, 1921. Application for reissue filed July 21, 1923. Serial No. 652,995.

*To all whom it may concern:*

Be it known that I, JOSEPH E. JUDY, a citizen of the United States, residing at McKeesport, in the county of Allegheny and State of Pennsylvania, have invented certain new and useful Improvements in Drilling Machines for Tapping Out the Hot Metal of Furnaces and Cupolas, of which the following is a specification, reference being had therein to the accompanying drawings.

This invention relates to drilling machines for tapping out the hot metal of furnaces and cupolas to permit the hot metal to run into the pots or ladles.

The invention contemplates the provision of a drilling machine adapted to be operated by fluid pressure and to be suspended from a jib crane or other movable supporting element and swung into position in front of the tapping hole and held there during the drilling of the hole.

A further object of the invention is the provision of means to blow the dust out of the hole as fast as it is bored or drilled.

Further objects and advantages of the invention will be set forth in the detailed description which follows.

Figure 1:
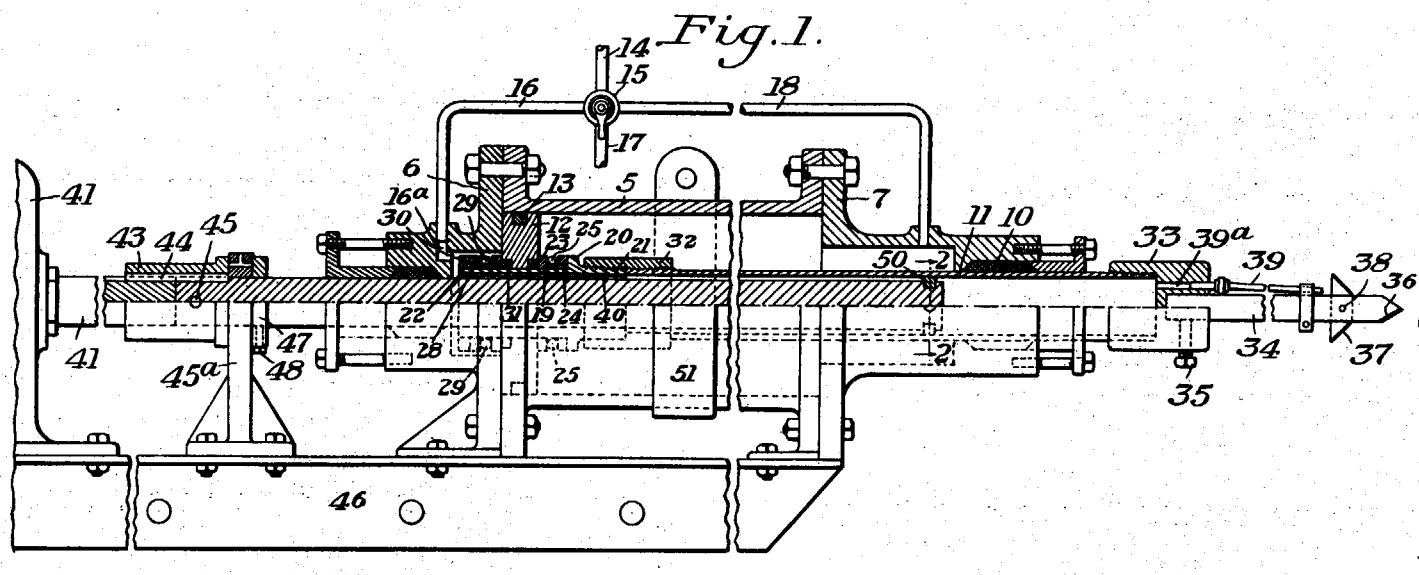
Figure 2:
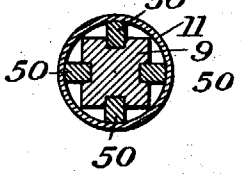

In the accompanying drawing:

Figure 1 is a view partly in side elevation and partly in longitudinal section of a drilling machine constructed in accordance with the invention, and Figure 2 is a transverse sectional view upon line 2—2 of Figure 1 illustrating an angular rotary shaft and a tubular piston rod, hereinafter described.

Referring to the drawing 5 designates a cylinder, the ends of which are closed by heads 6 and 7. A stuffing box 8 in the head 6 provides means for maintaining a fluid tight joint about a shaft 9 which at that point is round in cross section. A stuffing box 10 carried by the head 7 provides means for maintaining a tight joint about a tubular piston rod 11, which has both reciprocatory and rotative movement in said stuffing box. A piston 12 is mounted in the cylinder 5 and is provided with a piston ring 13. A fluid pressure supply pipe 14 delivers steam, compressed air or other pressure fluids, to a four way valve 15, said valve, when in one position, admitting the pressure fluid from the pipe 14 to one end of the cylinder through a pipe 16 and port 16ª and establishing communication between the other end of the cylinder and an exhaust pipe 17 through pipe 18, and when in another position, admitting the pressure fluid to the last named end of the cylinder through pipe 18 and connecting the other end of the cylinder with the exhaust pipe 17 as will be readily understood.

The piston 12 is mounted upon a spool 19, said spool being capable of rotation with respect to the piston. This spool comprises a shoulder 20, a threaded extension 21 and a threaded end 22. Bearing plates 23 and 24 constitute ball races which receive ball-bearings 25 between them. A corresponding antifriction bearing is disposed upon the opposite side of the piston and comprises the bearing plates 27 and 28 and balls 29. All of these parts are held in assembled relation upon the spool by means of a retaining nut 30. Packing 31 of any suitable nature is disposed between the piston and the periphery of the spool and prevents the pressure fluid within the cylinder from passing from one side of the piston to the other.

The extension 21 of the spool is connected by a sleeve or coupling 32 with the hollow piston rod 11 and this hollow piston rod is provided exteriorly of the cylinder with a coupling or block 33 in which a drill 34 is held by a set screw or like fastening device 35. The drill is pointed at 36 and in addition is provided with a flaring countersinking cutter 37 which traverses the drill and is held therein by a set screw 38. An air or steam pipe 39 terminates rearwardly of the cutter 37 and receives its supply of pressure fluid from the hollow piston rod through a bore 39ª. The hollow piston rod in turn receives this pressure fluid from a port 40 which is formed longitudinally through the spool and the rear end of which is in communication with port 16ª.

The shaft 41 of a motor 42 is connected by a coupling sleeve 43 with the end of the shaft 9 through the medium of keys 44 and pin 45. Thus the shaft 9 is caused to rotate with the shaft 41 of the motor. The sleeve 43 lies upon one side of a bearing plate 45ª that is supported upon the bed plate 46 and a collar 47 secured to the shaft 9 by a set screw 48 bears upon the opposite side of this plate, the whole constituting a thrust bearing to prevent endwise movement of the shaft 9.

Thus it will be understood that the shaft 9 rotates but does not reciprocate. The hollow piston rod 11 rotates and reciprocates, while the piston 12 reciprocates but does not rotate. As before stated, that portion of the shaft 9 which passes through the stuffing box 8 is round, but that portion of said shaft upon which the spool reciprocates is angular in cross section, as is illustrated in Figure 2, and to hold it in properly centered relation with respect to the hollow piston rod, it is provided with a plurality of spacing blocks 50 which bear upon the inner periphery of the hollow piston rod.

A clamping band 51 surrounds the cylinder 5 and provides means for supporting the entire structure from a jib crane. In operation the device is swung around in front of the tapping hole and compressed air is then admitted to the rear end of the cylinder in the manner described. This forces the piston 12 forwardly in the cylinder and brings the point of the drill into contact with the plug hole that is to be opened. The motor 42 is then started and rotation is imparted to the drill through shaft 9, spool 19, hollow piston rod 11, and block 33. Pressure is maintained in the rear of the piston during the drilling operation to force the drill forwardly and some of the pressure fluid finds its way through pipe 39 and blows the dust away as fast as the hole is drilled. Thus the hole is drilled and kept clean in one operation. The instant that the drill goes through the plug that is to be removed from the tapping hole, the four way valve is turned to the other position and pressure is admitted in front of the piston to force the drill and piston back to the starting point. When this is done the drilling machine, by means of the crane is swung back clear of the pouring trough and the hot metal is permitted to pour out into the pots or ladles.

Having described my invention what I claim and desire to secure by Letters Patent is:

1. A device of the character described comprising as a bodily portable unit, a base, a pressure cylinder mounted upon said base, a piston in said cylinder, a piston rod mounted to rotate with respect to the piston, an electric motor upon the base outside of the cylinder and serving to impart rotation to the piston rod, a drill carried by the piston rod, means for admitting pressure fluid to the cylinder to actuate the piston and the piston rod to advance and retract the drill and a suspension element through which the entire unit may be suspended in such manner as to support the drill in a substantially horizontal position while said unit is being swung to and from the tapping hole of a furnace.

2. A device of the character described comprising as a bodily portable unit, means through which said unit may be hung for swinging movement to and from the tapping hole of a furnace, of a horizontally disposed frame, a horizontally disposed pressure cylinder on the frame, an electric motor coaxial with said cylinder, a shaft connected to said motor and rotated by said motor, a spool slidably mounted upon an angular portion of the shaft, a piston mounted to rotate with respect to said spool, a hollow piston rod connected to said spool and a drill carried by said hollow piston rod.

3. A device of the character described comprising a supporting base, a motor mounted thereon, a pressure cylinder mounted thereon, a shaft projecting into the pressure cylinder and having an angular portion therein, means for connecting said shaft to the shaft of the motor, a thrust bearing resisting endwise movement of said shaft, a spool within the cylinder slidably mounted upon the angular portion of the shaft, said spool having an air port formed therethrough, a hollow piston rod connected to said spool, said port communicating with the interior of said hollow piston rod, antifriction bearings upon the periphery of the spool, a piston carried by the spool and disposed between said antifriction bearings, guiding elements carried by the angular portions of the shaft and bearing against the inner periphery of the hollow piston rod, a drill, a coupling between said drill and the hollow piston rod, an air blast pipe and means establishing communication between the air blast pipe and the interior of the hollow piston rod.

4. In a furnace tapping machine, a motor having a driving shaft carried by a base and held against movement relative thereto, a drill spindle reciprocally carried by the motor shaft, means for connecting a drill to the spindle, and means intermediate the motor and the drill for advancing and retracting the drill.

5. In a furnace tapping machine, a rotary and reciprocatory drill carrying member, rotating means for said member, a cylinder, a non-rotatable piston within said cylinder, slidably and rotatably carried by said rotating means for reciprocating said member, and means for directing an actuating medium to opposite sides of said piston.

6. In a furnace tapping machine, a rotary and reciprocatory drill-carrying member, a shaft for rotating said member, a cylinder, a non-rotatable piston within said cylinder slidably and rotatably carried by said shaft for reciprocating said member, means for directing an actuating medium to opposite sides of said piston, and means adjacent the opposite end of said cylinder from the drill-carrying member for rotating said shaft.

7. In a furnace tapping machine a bodily portable unit, a pressure cylinder, a non-rotatable piston therein, a drill carrying member projecting from one end of the pressure cylinder and adapted to be forced forwardly by said piston, connections between said member and the piston arranged to permit said member to rotate relative to said piston and means located adjacent the opposite end of the pressure cylinder for imparting rotation to said drill carrying member.

8. In a furnace tapping machine a bodily movable base, a motor thereon adjacent one end of the same, a cylinder on said base, a piston rod, a drill carried by the piston rod and projecting forwardly beyond the opposite end of the base, the piston rod being operatively connected to said motor for rotation thereby, a piston on said piston rod, and means for admitting pressure to the opposite sides of said piston for the purpose of advancing and retracting drill.

9. In a furnace tapping machine, a pressure cylinder, a piston therein, a piston rod connected to the piston and mounted to rotate with respect to the piston, a shaft telescopically connected to the piston rod and arranged to rotate the piston rod, means to rotate said shaft, a drill carried by the piston rod, and means for admitting fluid pressure to the cylinder to actuate the piston and piston rod to advance and retract the drill.

10. In a furnace tapping machine, a portable base, a motor adjacent one end thereof, a shaft connected to said motor and rotated thereby, a pressure cylinder into which said shaft projects, a spool slidably mounted upon the shaft within the piston and rotatable therewith, a piston rotatably carried by said spool, a piston rod connected to said spool, and a drill carried by said piston rod and projecting beyond the opposite end of the base.

11. In a furnace tapping machine, a bodily portable unit, a supporting frame, a pressure cylinder thereon, a piston in said cylinder, a drill carrying member adapted to be forced forwardly by said piston, means remote from said drill carrying member for imparting rotation thereto, and a suspension means whereby said unit may be suspended with the drill in operative tapping position.

In testimony whereof I hereunto affix my signature.

JOSEPH E. JUDY.